United States Patent
Purdy et al.

(10) Patent No.: US 12,320,066 B2
(45) Date of Patent: *Jun. 3, 2025

(54) MODIFIED SULFURIC ACID AND USES THEREOF

(71) Applicant: SixRing Inc., Calgary (CA)

(72) Inventors: Clay Purdy, Medicine Hat (CA); Markus Weissenberger, Calgary (CA); Kyle G. Wynnyk, Calgary (CA); Karl W. Dawson, Calgary (CA)

(73) Assignee: SIXRING INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,991

(22) Filed: Sep. 11, 2023

(65) Prior Publication Data

US 2023/0416985 A1    Dec. 28, 2023

Related U.S. Application Data

(62) Division of application No. 17/187,122, filed on Feb. 26, 2021, now Pat. No. 11,846,067.

(30) Foreign Application Priority Data

Feb. 28, 2020  (CA) ...................................... 3074199

(51) Int. Cl.
C01B 17/69 (2006.01)
D21B 1/02 (2006.01)
D21C 3/04 (2006.01)

(52) U.S. Cl.
CPC ............... D21C 3/04 (2013.01); C01B 17/69 (2013.01); D21B 1/021 (2013.01)

(58) Field of Classification Search
None
See application file for complete search history.

(56) References Cited

U.S. PATENT DOCUMENTS

| | | | |
|---|---|---|---|
| 2,855,351 A | 10/1958 | Ermst | |
| 3,509,206 A | 4/1970 | Nielsen | |
| 3,655,738 A | 11/1972 | Nielsen | |
| 4,626,319 A | 12/1986 | Kruger et al. | |
| 4,704,404 A | 11/1987 | Sanderson | |
| 4,756,845 A | 7/1988 | Sugawara et al. | |
| 4,935,499 A | 6/1990 | Ruske et al. | |
| 5,080,756 A | 1/1992 | Kutney | |
| 5,691,193 A | 11/1997 | Paice et al. | |
| 5,955,050 A | 9/1999 | Drexler | |
| 9,499,405 B2 | 11/2016 | Dindi | |
| 9,890,321 B2 | 2/2018 | Shumway | |
| 2003/0224960 A1 | 12/2003 | Scialla et al. | |
| 2004/0099637 A1 | 5/2004 | Johnson et al. | |
| 2010/0291722 A1 | 11/2010 | Kim et al. | |
| 2012/0217500 A1 | 8/2012 | Park et al. | |
| 2013/0122701 A1 | 5/2013 | Krupa et al. | |
| 2013/0156631 A1 | 6/2013 | Kumagai et al. | |
| 2014/0113843 A1 | 4/2014 | Shumway | |
| 2014/0121145 A1 | 5/2014 | Paasche et al. | |
| 2014/0349359 A1 | 11/2014 | Fernholz et al. | |
| 2016/0021888 A1 | 1/2016 | Burke et al. | |
| 2016/0074549 A1 | 3/2016 | Lei et al. | |
| 2016/0264420 A1 | 9/2016 | Dindi | |
| 2016/0298294 A1 | 10/2016 | Dietz et al. | |
| 2016/0304989 A1 | 10/2016 | Pujari et al. | |
| 2020/0010959 A1 | 1/2020 | Hong | |
| 2021/0269394 A1 | 9/2021 | Purdy et al. | |
| 2021/0269970 A1 | 9/2021 | Purdy et al. | |
| 2021/0269971 A1 | 9/2021 | Purdy et al. | |

FOREIGN PATENT DOCUMENTS

| | | | |
|---|---|---|---|
| CA | 2134270 A1 | | 4/1996 |
| CA | 2744569 A1 | | 6/2010 |
| CA | 2889135 A1 | | 5/2014 |
| CA | 2923100 A1 | | 9/2016 |
| CN | 103572306 A | | 2/2014 |
| CN | 103820796 A | | 5/2014 |
| CN | 104040061 | * | 9/2014 |
| CN | 109761380 A | | 5/2019 |
| CN | 109877097 A | | 6/2019 |
| CN | 109898085 | | 6/2019 |
| CN | 110485188 A | | 11/2019 |
| EP | 0199385 A2 | | 10/1986 |
| EP | 0779357 A1 | | 6/1997 |
| JP | H07206804 A | | 8/1995 |
| JP | 2010285697 A | | 12/2010 |
| KR | 20150114655 | | 10/2015 |
| RU | 2634586 | * | 10/2017 |
| WO | 1996012673 A1 | | 5/1996 |
| WO | WO2010106182 | * | 9/2010 |
| WO | 2014065972 A1 | | 5/2014 |
| WO | 2019055789 | * | 3/2019 |
| WO | WO-2019055789 A1 | * | 3/2019 |

OTHER PUBLICATIONS

CN 108468050 A, English language Abstract; 2018.
CN 108069519 A, English language Abstract; 2018.
CN 109628934 A, English language Abstract; 2019.
CN 109898085 A, English language Abstract; 2019.
Rackemann et al., 2016 "The effect of pretreatment on methanesulfonic acid-catalyzed hydrolysis of bagasse to evulnic acid, formic acid, and furfural," RSC Advances 6(78):74525-35.
International Search Report from related Aplication No. PCT/CA2021/000016, mailed May 26, 2021 (5 pages).

\* cited by examiner

*Primary Examiner* — Sheng H Davis
(74) *Attorney, Agent, or Firm* — Blank Rome LLP

(57) ABSTRACT

A modified aqueous acid composition comprising: sulfuric acid; a compound comprising an amine moiety and a sulfonic acid moiety; and a peroxide; wherein sulfuric acid, said compound comprising an amine moiety and a sulfonic acid moiety and said peroxide are present in a molar ratio of no less than 1:1:1. Also disclosed are methods of using such compositions.

9 Claims, 5 Drawing Sheets

BEFORE EXPOSURE

EXPOSURE TIME t=0 min

EXPOSURE TIME t=4 min

EXPOSURE TIME t=6 min

EXPOSURE TIME t=10 min

EXPOSURE TIME t=15 min

EXPOSURE TIME t=30 min

EXPOSURE TIME t=45 min

BEFORE EXPOSURE

EXPOSURE TIME t=0 min

EXPOSURE TIME t=5 min

EXPOSURE TIME t=10 min

EXPOSURE TIME t=15 min

EXPOSURE TIME t=30 min

EXPOSURE TIME t=45 min

EXPOSURE TIME t=60 min

EXPOSURE TIME t=75 min

MODIFIED SULFURIC ACID AND USES THEREOF

1. CROSS-REFERENCE TO RELATED APPLICATIONS

The present application is a divisional of U.S. patent application Ser. No. 17/187,122, filed on Feb. 26, 2021, which claims priority to Canada Application Serial No. 3074199, filed on Feb. 28, 2020. The entire contents of the above applications are incorporated herein by reference in their entirety.

2. FIELD OF THE INVENTION

The present invention is directed to a method and composition useful in decomposing organic material by oxidation such as, but not limited to, the delignification of wood substance, as an example and more specifically, to a method and composition for performing such under more optimal conditions than those under which the kraft process is currently conducted.

3. BACKGROUND OF THE INVENTION

The first step in paper production and most energy-intensive one is the production of pulp. Notwithstanding water, wood and other plant materials used to make pulp contain three main components: cellulose fibers; lignin; and hemicelluloses. Pulping has a primary goal to separate the fibers from the lignin. Lignin is a three-dimensional polymer which figuratively acts as a mortar to hold all the fibers together within the plant. Its presence in finished pulp is undesirable and adds nothing to the finished product. Pulping wood refers to breaking down the bulk structure of the fiber source, be it chips, stems or other plant parts, into the constituent fibers. The cellulose fibers are the most desired component when papermaking is involved. Hemicellulose is a shorter branched carbohydrate polymer consisting of various sugar monomers which form a random amorphous polymeric structure. The presence of hemicellulose in finished pulp is not as critical to paper rigidity as cellulose is. This is also true for biomass conversion. The challenges are similar. Only the desired outcome is different. Biomass conversion would have the further breakdown to monocarbohydrates as a desired outcome while a pulp & paper process normally stops right after lignin dissolution.

There are two main approaches to preparing wood pulp or woody biomass: mechanical treatment and chemical treatment. Mechanical treatment or pulping generally consists of physically tearing the wood chips apart and, thus, tearing cellulose fibers apart in an effort to separate them from each other. The shortcomings of this approach include: broken or damaged cellulose fibers, thus shorter fibers; and lignin contamination or residue on the cellulose fibers, thus introducing or leaving behind impurities of the final product. This process also consumes large amounts of energy and is capital intensive due to the high pressure, corrosive chemicals and heat required. There are several approaches or processes included in chemical pulping. These are generally focused on the degradation the lignin and hemicellulose into, water-soluble molecules. These now degraded components are separated from the cellulose fibers by washing the latter without damaging the cellulose fibers. The chemical process is currently energy intensive as well, as high amounts of heat are typically required; and, in many cases, also require agitation or mechanical intervention adding inefficiencies and costs to the process.

There exists pulping or treatment methods which combine, to a various extent, the chemical aspects of pulping with the mechanical aspects of pulping. To name a few, one must consider include thermomechanical pulping (also commonly referred to as TMP), and chemithermomechanical pulping (CTMP). Through a selection of the advantages provided by each general pulping method, the treatments are designed to reduce the amount of energy required by the mechanical aspect of the pulping treatment. This can also directly impact the strength or tensile strength degradation of the fibers subjected to these combination pulping approaches. Generally, these approaches involve a shortened chemical treatment (compared to conventional exclusive chemical pulping) which is then typically followed by mechanical treatment to separate the fibers.

The most common process to make pulp for paper production is the kraft process. In the kraft process, wood chips are converted to wood pulp which is almost entirely pure cellulose fibers. The multi-step kraft process consists of a first step where wood chips are impregnated/treated with a chemical solution called white liquor: a strong alkaline solution comprising sodium hydroxide and sodium sulfide. This is done by soaking the wood chips and then heating them with steam. This step swells the wood chips and expels the air present in them and replaces the air with the white liquor. Once the wood material has been soaked in the various chemical solutions, they undergo cooking. To achieve delignification in the wood chips, the cooking is carried out for several hours at temperatures reaching up to 176° C. At these temperatures, the lignin degrades to yield water soluble fragments. This produces black liquor, a resultant by-product from the kraft process. It contains water, lignin residues, hemicellulose and inorganic chemicals. The remaining cellulosic fibers are collected and washed after the cooking step.

U.S. Pat. No. 5,080,756 teaches an improved kraft pulping process and is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known and is highly explosive. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one to prepare in a further reaction potassium monopersulfate (PMPS) which is a valuable bleaching agent and oxidizer. While Caro's acid has several known useful applications, one noteworthy use is in the delignification of wood.

Similar to Caro's acid, peracetic acid with sulfuric acid (35%) forms flammable vapor and liquids. So if heating a reaction containing such a mixture, there is a possibility to a have flammable material and strong oxidizer present which would be a major safety concern and could lead to explosions. The use of such reactive material is not welcome in large scale application as the unacceptable risk profile is prohibitive of such. Safety concerns are mostly similar between Caro's acid and peracetic acid (with Sulfuric acid) as they are corrosive and strong oxidizers.

Biofuel production is another potential application for the kraft process. One of the current drawbacks of biofuel production is that it requires the use of food grade plant parts (such as seeds) in order to transform carbohydrates into fuel in a reasonably efficient process. The carbohydrates could be obtained from cellulosic fibers, by using non-food grade biomass in the kraft process; however, the energy intensive nature of the kraft process for delignification makes this a less commercially viable option. In order to build a plant based chemical resource cycle there is a great need for energy efficient processes which can utilize plant-based feedstocks that don't compete with human food production.

While the kraft pulping process is the most widely used chemical pulping process in the world, it is extremely energy intensive and has other drawbacks, for example, substantial odours emitted around pulp producing plants, and general emissions that are now being highly regulated in many pulp and paper producing jurisdictions. In light of the current environmental issues contributing to climactic changes, along with emissions fees or taxes being implemented, it is highly desirable to optimize the current pulping processes to economically provide quality fibers without the current detrimental effects to the environment during the production thereof. Accordingly, there exists a need for a composition capable of performing delignification on wood substance at reduced temperatures and pressures versus what is currently in use, without requiring substantial additional capital expenditures.

4. SUMMARY OF THE INVENTION

According to an aspect of the present invention, there is provided a modified aqueous acid composition comprising:
  sulfuric acid;
  a compound comprising an amine moiety and a sulfonic acid moiety; and
  a peroxide;
wherein sulfuric acid, said compound comprising an amine moiety and a sulfonic acid moiety, and said peroxide are present in a molar ratio of no less than 1:1:1.

According to a preferred embodiment, the sulfuric acid, said compound comprising an amine moiety and a sulfonic acid moiety, and said peroxide are present in a molar ratio of no more than 15:1:1.

According to another aspect of the present invention, there is provided a modified acid composition comprising:
  sulfuric acid;
  a compound comprising an amine moiety and a sulfonic acid moiety;
wherein sulfuric acid and said compound comprising an amine moiety and a sulfonic acid moiety are present in a molar ratio of no less than 3:1.

Preferably, said compound comprising an amine moiety and a sulfonic acid moiety is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of C1-C5 linear alkyl and C1-C5 branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl.

Most preferably, said compound comprising an amine moiety and a sulfonic acid moiety is taurine.

According to a preferred embodiment, said sulfuric acid and compound comprising an amine moiety and a sulfonic acid moiety are present in a molar ratio of no less than 3:1.

According to another aspect of the present invention, there is provided an aqueous composition for use in the delignification of wood or woody pulp, wherein said composition comprises:
  sulfuric acid in a 20-70 wt %;
  a compound comprising an amine moiety and a sulfonic acid moiety selected from the group consisting of: taurine; taurine derivatives; and taurine-related compounds; and
  a peroxide.

Preferably, the composition has a pH of less than 1. More preferably, the composition has a pH of less than 0.5.

According to a preferred embodiment of the present invention, there is provided a composition for use in the delignification of wood, wherein said composition comprises:
  sulfuric acid in a 40-80 wt %;
  a compound comprising an amine moiety and a sulfonic acid moiety selected from the group consisting of: taurine and derivatives thereof such as taurine-related compounds; wherein the sulfuric acid and said amine-containing compound are present in a mole ratio ranging from 3:1 to 15:1.

Preferably, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

According to another aspect of the present invention, there is provided an aqueous composition for use in the breaking down or separation of cellulose from a plant source, wherein said composition comprises:
  sulfuric acid in a 20-70 wt %;
  a compound comprising an amine moiety and a sulfonic acid moiety selected from the group consisting of: taurine; taurine derivatives; and taurine-related compounds; and
  a peroxide;
wherein the sulfuric acid and said amine-containing compound are present in a mole ratio ranging from 3:1 to 15:1.

Preferably, said compound comprising an amine moiety and a sulfonic acid moiety is taurine.

According to a preferred embodiment of the present invention, the peroxide is hydrogen peroxide.

According to another aspect of the present invention, there is provided a method of delignification of plant material, said method comprising:
  providing said plant material comprising cellulose fibers and lignin;
  exposing said plant material requiring to a composition comprising:
    sulfuric acid in a 20-70 wt %;
    a compound comprising an amine moiety and a sulfonic acid moiety selected from the group consisting of: taurine; taurine derivatives; and taurine-related compounds; and
    a peroxide;
for a period of time sufficient to remove substantially all of the lignin present on said plant material.

Taurates are used as mild, well-foaming surfactants in body cleansing and personal care products; textile processing such as wetting agents; detergents; and dye dispersants; and, in crop protection formulations as well as other industrial uses.

The inventors have discovered that delignification of wood material (such as, but not limited to wood chips or other common biomass) can occur at substantially lower temperatures than those used during conventional kraft pulping. In fact, some experiments were conducted at average room temperatures in the range of 18-21° C. with the preferred compositions and according to the present invention were shown to degrade the lignin present on wood chips to free up cellulose fibers very efficiently. According to another preferred embodiment of a method according to the present invention, a wood sample was dissolved at 30° C. upon exposure to a composition according to a preferred embodiment of the present invention. According to a preferred embodiment of the present invention, one could substantially reduce the energy costs, capital costs involved, and greatly reduce the associated emissions currently emitted in pulp delignification by applying a method involving a preferred composition of the present invention. According to another preferred embodiment of a method according to the present invention, biomass could be dissolved at 0° C. upon exposure to a preferred composition of the present invention.

According to a preferred embodiment of the present invention, there is provided a multi-step process depending on time and temperature and molar ratios of a preferred composition of the present invention, wherein separate steps of dissolution achieve:
1. Delignification;
2. Dissolution of hemicellulose; and
3. Dissolution of crystalline cellulose.

5. BRIEF DESCRIPTION OF THE FIGURES

The invention may be more completely understood in consideration of the following description of various embodiments of the invention in connection with the accompanying figures, in which.

6. DESCRIPTION OF THE INVENTION

Figure 1:
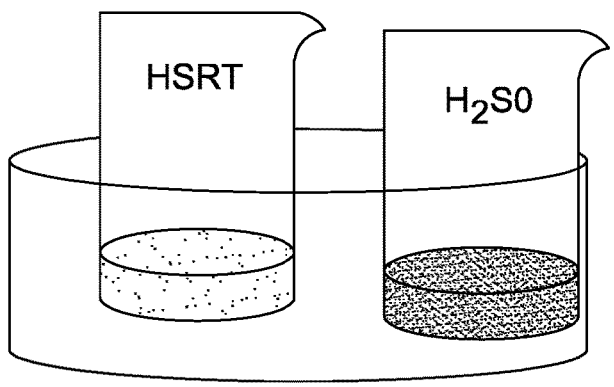
FIG. 1 is a photograph comparing the dissolution of a wood chip in sulfuric acid (right beaker) and a composition according to the present invention (left beaker) where the time elapsed was 1 minute.

The experiments carried out using an aqueous acidic composition according to a preferred embodiment of the present invention has shown that woody biomass can be delignified under controlled reaction conditions and eliminate, or at least minimize, the degradation of the cellulose. Degradation is understood to mean a darkening of cellulose or carbonization (conversion to carbon black) which is symbolic of an uncontrolled acid attack on the cellulose and staining thereof.

Preferably, a composition according to the present invention comprises:
  sulfuric acid; and
  a compound comprising an amine moiety and a sulfonic acid moiety selected from the group consisting of: taurine; taurine derivatives and taurine-related compounds.

Preferably, the taurine derivatives and taurine-related compounds are understood to include: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of C1-C5 linear alkyl and C1-C5 branched alkyl. Preferably, the linear alkylaminosulfonic acid is selected form the group consisting of: methyl; ethyl (taurine); propyl; and butyl. Preferably, the branched aminoalkylsulfonic acid is selected from the group consisting of: isopropyl; isobutyl; and isopentyl.

According to a preferred embodiment, the taurine derivatives and taurine-related compounds are selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates.

Most preferably, the compound comprising an amine moiety and a sulfonic acid moiety is taurine.

When performing delignification of wood using a composition according to a preferred embodiment of the present invention, the process can be carried out at substantially lower temperatures than temperatures used in the conventional kraft pulping process. The advantages are substantial, here are a few: the current kraft pulping process requires temperatures in the vicinity of 176-180° C. in order to perform the delignification process, a preferred embodiment of the process according to the present invention can delignify wood at far lower temperatures, even as low as 20° C. in some cases. According to a preferred embodiment of the present invention, the delignification of wood can be performed at temperatures as low as 0° C. According to a preferred embodiment of the present invention, the delignification of wood can be performed at temperatures as low as 10° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C.

In each one of the above preferred embodiments, the temperature at which the processes are carried out are substantially lower than the current energy-intensive and inefficient kraft process.

Moreover, the kraft process uses high pressures to perform the delignification of wood which is initially capital intensive, dangerous, expensive to maintain, and has high associated turn-around or maintenance costs. According to a preferred embodiment of the present invention, the delignification of wood can be performed at atmospheric pressure. This, in turn, circumvents the need for highly specialized and expensive industrial equipment such as pressure vessels/digestors. It also allows the implementation of delignification units in many parts of the world where the implementation of a kraft plant would previously be impracticable due to a variety of reasons.

Some of the advantages of a process according to a preferred embodiment of the present invention, over a conventional kraft process are substantial as the heat/energy requirement for the latter is not only a great source of pollution, but is in large part the reason the resulting pulp product is so expensive and has high initial capital requirements. The energy savings in the implementation of a process according to a preferred embodiment of the present invention would be reflected in a lower priced pulp, and environmental benefits which would have both an immediate impact and a long-lasting multi-generational benefit for all.

Further cost savings in the full or partial implementation of a process according to a preferred embodiment of the present invention, can be found in the absence or minimization of restrictive regulations for the operation of a high temperature and high-pressure pulp digestors.

7. EXAMPLES

The composition according to a preferred embodiment of the present invention used in the delignification test was prepared by dissolving 1 molar equivalent of taurine into sulfuric acid and subsequently adding hydrogen peroxide. The final composition comprised sulfuric acid:taurine:hydrogen peroxide in a 5.0:1.7:1.0 molar ratio. Preferably, the resulting pH of the composition is less than 1. More preferably, the resulting pH of the composition is less than 0.5.

According to a preferred embodiment of the present invention, the composition provides a peroxide yield of above 25% after 7 days of mixing such composition. More preferably, the peroxide percent yield is above 35% after 2 weeks upon mixing said composition.

7.1. Delignification Experiment

A preferred embodiment of the composition according to the present invention was tested to determine its power in the delignification of a wood chip.

The experiments were completed using approximately 0.2 g of wood and approximately 20 g of solution. The mixtures were stirred at 200 rpm at a temperature of 30° C.

Figure 3:
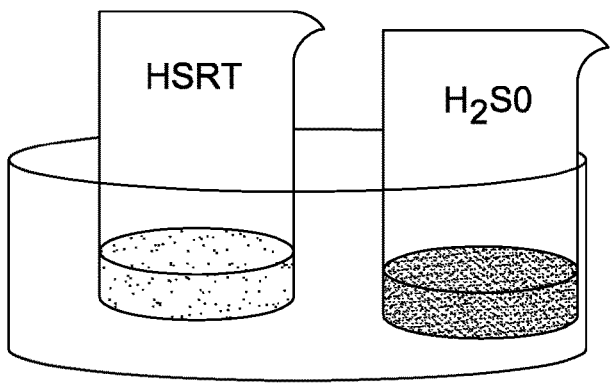
FIG. 3 is a photograph comparing the dissolution of a wood chip in sulfuric acid (right beaker) and a composition according to the present invention (left beaker) where the time elapsed was 8 minutes.
Figure 5:
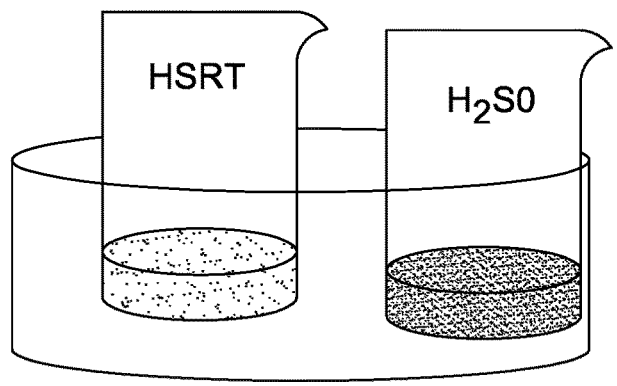
FIG. 5 is a photograph comparing the dissolution of a wood chip in sulfuric acid (right beaker) and a composition according to the present invention (left beaker) where the time elapsed was 16 minutes.
Figure 7:
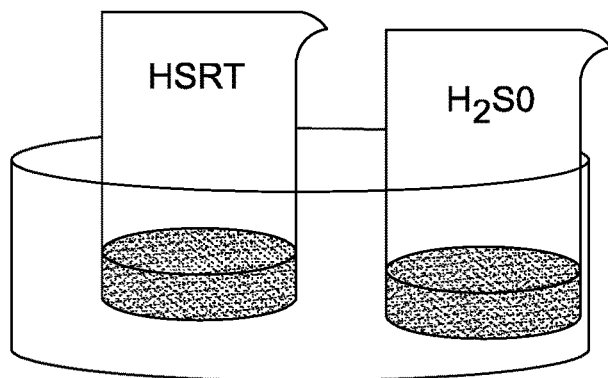
FIG. 7 is a photograph comparing the dissolution of a wood chip in sulfuric acid (right beaker) and a composition according to the present invention (left beaker) where the time elapsed was 26 minutes.
Figure 9:
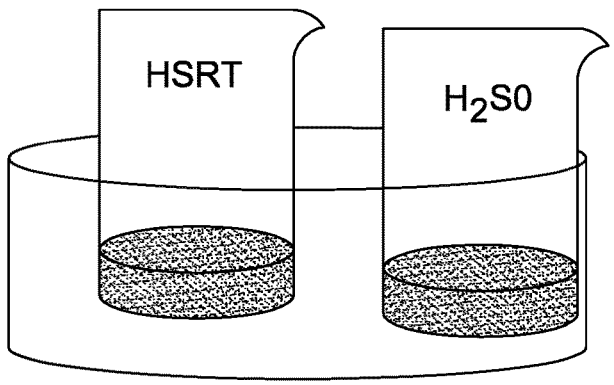
FIG. 9 is a photograph comparing the dissolution of a wood chip in sulfuric acid (right beaker) and a composition according to the present invention (left beaker) where the time elapsed was 39 minutes.
Figure 11:
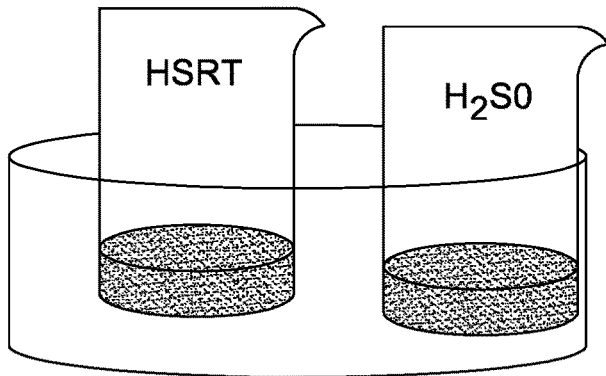
FIG. 11 is a photograph comparing the dissolution of a wood chip in sulfuric acid (right beaker) and a composition according to the present invention (left beaker) where the time elapsed was 44 minutes.
Figure 13:
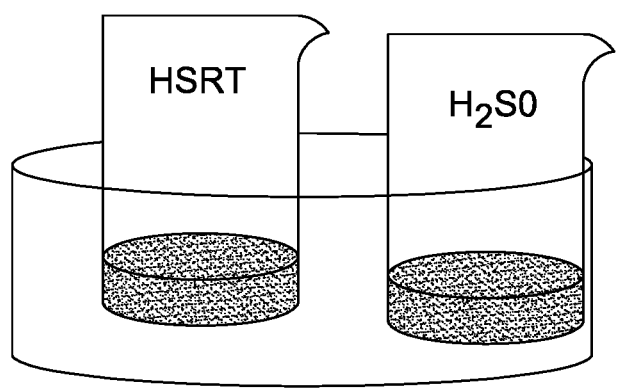
FIG. 13 is a photograph comparing the dissolution of a wood chip in sulfuric acid (right beaker) and a composition according to the present invention (left beaker) where the time elapsed was 60 minutes.

FIGS. 1, 3, 5, 7, 9, 11 and 13 show the dissolution of a wood chip in the presence of sulfuric acid (right beaker in all pictures) compared to a composition according to a preferred embodiment of the present invention (left beaker in all the pictures). The composition according to the preferred embodiment in question comprises sulfuric acid and taurine in a ratio of 3:1. It is noteworthy to point out that from the beginning of the experiment the right beaker showed evidence of the production of carbon black due to aggressive oxidation. This is an indication that the sulfuric acid not only degraded the lignin present in the wood chip, but also degraded cellulosic material quite rapidly to yield carbon black. The effect continues over the time period of the experiment up to a time elapsed of 60 minutes. The left beakers show a gradual darkening of the solution, also evidence of degradation of cellulosic material to carbon black, however, the reaction is substantially slowed to the point that the coloring of the solution is quite light at 8 minutes elapsed. Upon close observation, it was noted that even at 16 minutes of elapsed time, the solution presented a lighter discoloration than the sulfuric acid-only solution at 1 minute.

Figure 2:
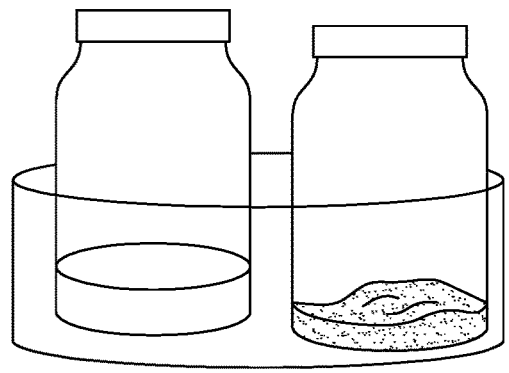
FIG. 2 is a photograph comparing the dissolution of a wood chip in sulfuric acid in the presence of peroxide (right beaker) and a composition according to the present invention in the presence of peroxide (left beaker) where the time elapsed was 1 minute.
Figure 4:
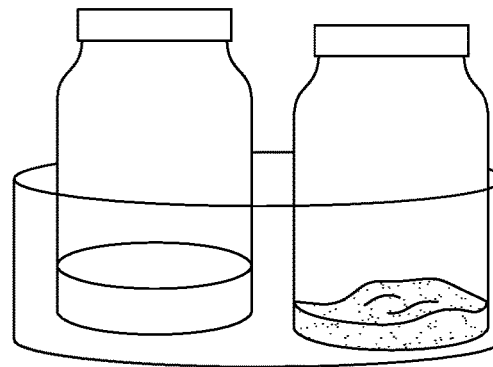
FIG. 4 is a photograph comparing the dissolution of a wood chip in sulfuric acid in the presence of peroxide (right beaker) and a composition according to the present invention in the presence of peroxide (left beaker) where the time elapsed was 5 minutes.
Figure 6:
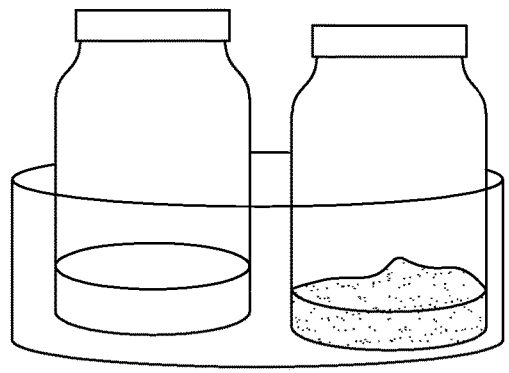
FIG. 6 is a photograph comparing the dissolution of a wood chip in sulfuric acid in the presence of peroxide (right beaker) and a composition according to the present invention in the presence of peroxide (left beaker) where the time elapsed was 10 minutes.
Figure 8:
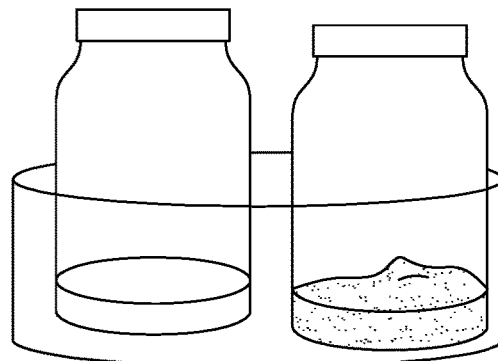
FIG. 8 is a photograph comparing the dissolution of a wood chip in sulfuric acid in the presence of peroxide (right beaker) and a composition according to the present invention in the presence of peroxide (left beaker) where the time elapsed was 15 minutes.
Figure 10:
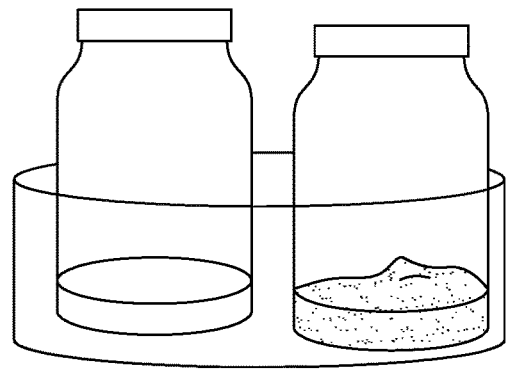
FIG. 10 is a photograph comparing the dissolution of a wood chip in sulfuric acid in the presence of peroxide (right beaker) and a composition according to the present invention in the presence of peroxide (left beaker) where the time elapsed was 25 minutes.
Figure 12:
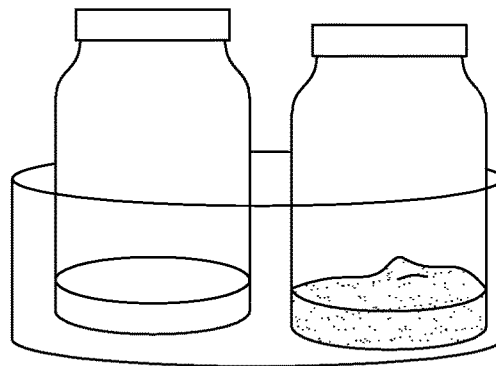
FIG. 12 is a photograph comparing the dissolution of a wood chip in sulfuric acid in the presence of peroxide (right beaker) and a composition according to the present invention in the presence of peroxide (left beaker) where the time elapsed was 40 minutes.
Figure 14:
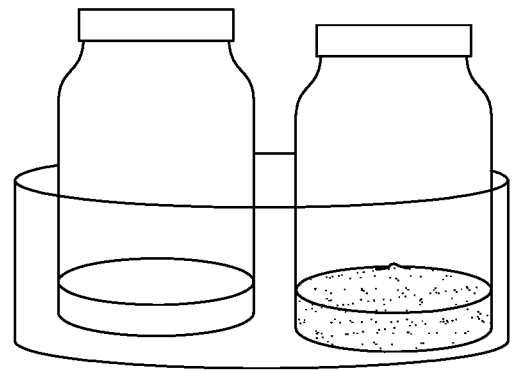
FIG. 14 is a photograph comparing the dissolution of a wood chip in sulfuric acid in the presence of peroxide (right beaker) and a composition according to the present invention in the presence of peroxide (left beaker) where the time elapsed was 60 minutes.

FIGS. 2, 4, 6, 8, 10, 12 and 14 show the dissolution of a wood chip in the presence of sulfuric acid and hydrogen peroxide (right beaker in all pictures) compared to a composition according to a preferred embodiment of the present invention also comprising hydrogen peroxide (left beaker in all the pictures). At 1 minute, it can be observed that the sulfuric acid/hydrogen peroxide solution is still quite clear although there is some coloring starting to appear. The coloring is indicative of carbon black residue present in the solution. In the beaker comprising a preferred composition of the present invention, the solution is still clear after 1 minute. In fact, even after 60 minutes the preferred embodiment solution remains clear. As for the sulfuric acid beaker, the solution gets somewhat darker at the 5-minute mark and no longer seems to degrade any further from that point on.

The above experiment is a clear indication that the composition according to the present invention not only provides an adequate dissolving acid to delignify plant material but is also valuable in controlling the ultimate degradation of cellulosic material into carbon black residue resulting in potentially higher yields for the operators, thus increasing profitability while reducing emissions and risks to employees, contractors and the public.

A method to yield glucose from wood pulp would represent a significant advancement to the current process where the conversion of such is chemically, energy, and emissions intensive; costly; and dangerous while not yielding highly efficient results, especially in large-scale operations. It is desirable to employ a composition which can delignify woody pulp, but also allows the operator some control in order to preserve the cellulose, rather than degrading it to carbon black, in order to improve efficiency and yields, increase safety, and reduce overall costs.

According to a preferred embodiment of the method of the present invention, the separation of lignin can be achieved and the resulting cellulose fibers can be further processed to yield glucose monomers. Glucose chemistry has a multitude of uses including as a starting block in the preparation of widely used chemicals including, but not limited to, diacetonide, dithioacetal, ethanol, glucoside, glucal and hydroxyglucal to name but a few.

7.2. Additional Delignification Experiments

Sulfuric acid, taurine and hydrogen peroxide were mixed with decreasing taurine concentrations and reacted with biomass (wood chips) overnight at ambient conditions to assess the effectiveness of the variation on the molar ratios on the extent of reaction. Control tests were run for the respective mixtures with just kraft lignin or just cellulose added instead of biomass. Commercially available lignin (Sigma-Aldrich; Lignin, kraft; Prod #471003) was used as a control in the testing. Commercially cellulose (Sigma-Aldrich; Cellulose, fibers (medium); Prod #C6288) was also used as a control in the testing.

The solid phase of each blend was filtered off after 20 h reaction time, rinsed with water and dried in an oven at 45° C. to constant weight. All data given as the average of triplicate runs. An effective blend should dissolve all lignin and leave the cellulose as intact as possible. The results of the experiments are reported in Table 1 below.

TABLE 1

| | Recovery of solids (% of initial mass) after 20 h reaction time | | |
|---|---|---|---|
| Blend | Wood (wt % remaining after reaction) | Lignin control (wt % remaining after reaction) | Cellulose control (wt % remaining after reaction) |
| 3:1:3 | 41.71 | 0.00 | 86.15 |
| 10:1:10 | 38.64 | 0.00 | 84.67 |
| 15:1:15 | 39.79 | 0.00 | 86.81 |

A blend with a molar ratio of 3:1:3 of sulfuric acid (96% conc. used) to taurine to hydrogen peroxide (as 30% solution) results in a mass recovery of 40% from wood and 86% from cellulose and none of the lignin. All lignin was broken down enough to get dissolved into the blend. It was noted that reducing the taurine concentration to a 10:1:10 or 15:1:15 does not significantly change the results for solids recovery. Even at the lowest concentration taurine is an effective retardant for the sulfuric acid to stabilize the reaction mixture.

7.3. Skin Corrosiveness Testing

To assess the immediate corrosiveness of a composition according to a preferred embodiment of the present invention, a visual comparative assessment was carried out using chicken skin. Two chicken skin samples were secured over the opening of two beakers. The first skin sample was exposed to a solution of sulfuric acid ($H_2SO_4$) and hydrogen peroxide ($H_2O_2$). The second skin sample was exposed to a composition according to a preferred embodiment of the present invention, namely sulfuric acid; taurine; and hydrogen peroxide ($H_2O_2$) (in a 5.0:1.7:1.0 molar ratio).

Figure 15A:
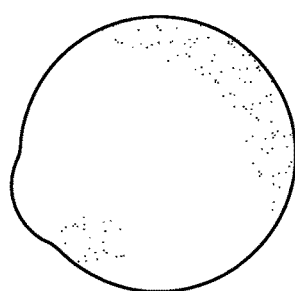
FIG. 15a to 15h are a series of photographs showing a chicken skin exposed to a conventional Caro's acid composition for a duration of up to 45 minutes.
Figure 15B:
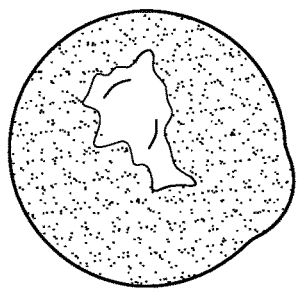
Figure 15C:
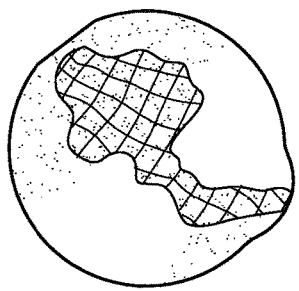
Figure 15D:
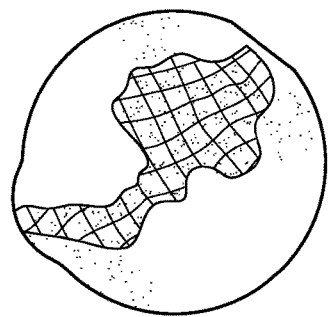
Figure 15E:
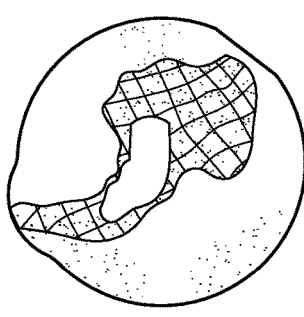
Figure 15F:
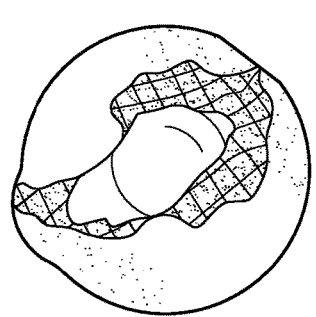
Figure 15G:
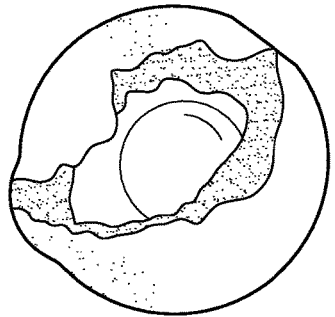
Figure 15H:
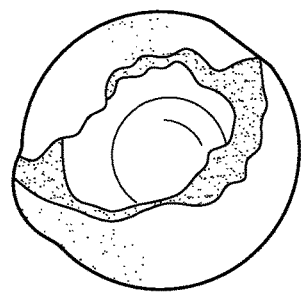
Figure 16A:
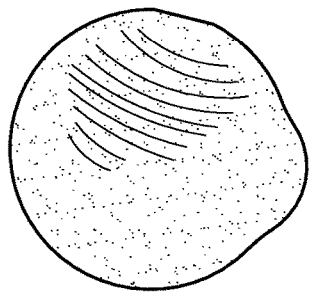
FIG. 16a to 16i are a series of photographs showing a chicken skin exposed to a modified Caro's acid composition according to a preferred embodiment of the present invention for a duration of up to 75 minutes.
Figure 16B:
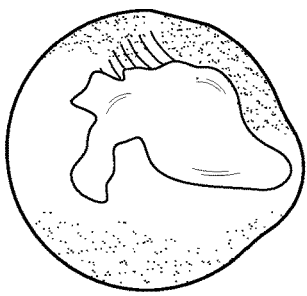
Figure 16C:
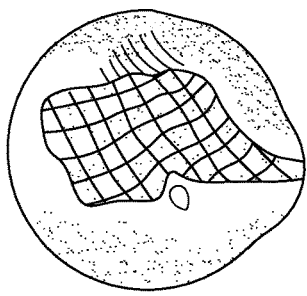
Figure 16D:
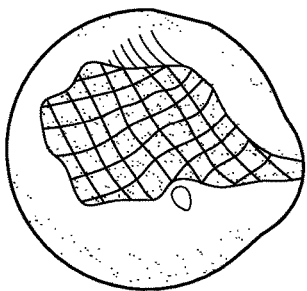
Figure 16E:
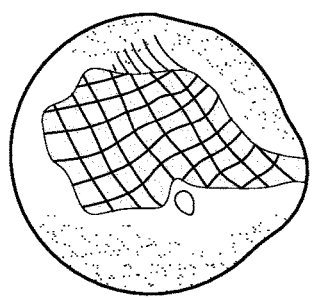
Figure 16F:
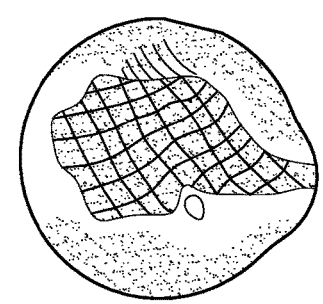
Figure 16G:
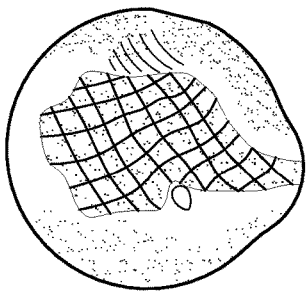
Figure 16H:
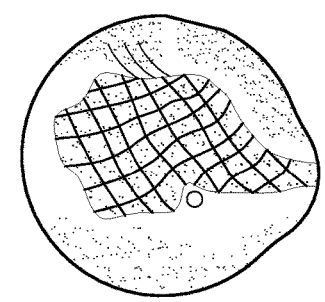
Figure 16I:
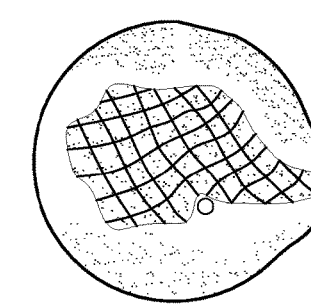

FIG. 15a-h (showing the skin treated with the standard $H_2SO_4$—$H_2O_2$ solution) shows the results of the corrosiveness at times of 0, 4, 6, 10, 15, 30 and 45 minutes. FIG. 16a-i (showing the skin treated with a $H_2SO_4$-taurine-$H_2O_2$ composition as described above) shows the results of the corrosiveness at times of 0, 5, 10, 15, 30, 45, 60 and 75 minutes. This dermal corrosiveness test comparison between conventional Caro's Acid and a modified Caro's Acid (in a 3:1 sulfuric acid:taurine molar ratio) highlights the safety advantage of the composition according to a preferred embodiment of the present invention. The sulfuric acid concentrations in Caro's acid and modified Caro's acid are approximately 80 wt % and 60 wt % respectively, whereas the hydrogen peroxide concentration was equivalent.

The conventional Caro's acid leads to a breakthrough after ca. 5.5 min. The modified Caro's Acid according to the preferred embodiment described and tested breaks through the skin sample after approximately 45 minutes, but the degree of breakthrough is much smaller compared to the conventional Caro's acid. Despite the fact that this is not an OECD recognized official test, this test clearly highlights the advantages that a person, accidentally exposed to the modified Caro's acid according to an embodiment of the present invention, has significantly more time available to find a safety shower to minimize irreversible skin damage and further injuries.

7.4. Titration of Caro's Acid and a Preferred Composition of the Present Invention The inventors have titrated both Caro's acid (5.57:1 molar ratio of $H_2SO_4$:$H_2O_2$) and a modified Caro's acid (5.0:1.7:1.0 molar ratio of $H_2SO_4$:Taurine:$H_2O_2$) both of which were synthesized using an ice bath and constant stirring. The compositions are stored capped, but not sealed in a water bath at a constant temperature of 30° C.

To determine the concentration of $H_2O_2$, the solutions were titrated against a standardized $KMnO_4$ solution. The titration procedure follows:
1. A solution with approximately 245 mL of $dH_2O$ and 5 mL of 96% $H_2SO_4$ is prepared
2. Approximately 1 g of Caro's acid/modified Caro's acid is measured by an analytical balance and recorded
3. The diluted $H_2SO_4$ solution is used to quantitatively transfer the measured Caro's acid/modified Caro's acid into a 300 mL Erlenmeyer flask
4. The solution is mixed constantly with a magnetic stir plate/stir bar during the titration
5. The solution is titrated using the standardized $KMnO_4$ solution until the appearance of a persistent pink color for at least 1 minute.

The moles of $H_2O_2$ found in the titrated sample and the moles of $H_2O_2$ used in the synthesis are used to calculate the percent yield.

TABLE 2

Titration results of Caro's Acid and a preferred composition of the present invention

| | Caro's acid Percent yield of $H_2O_2$ | Modified Caro's acid Percent yield of $H_2O_2$ |
|---|---|---|
| as synthesised | 16.2 | 38.9 |
| 2 days | 18.1 | 40.0 |
| 5 days | 16.6 | 47.9 |
| 7 days | 15.5 | 54.9 |
| 12 days | 7.7 | 52.7 |
| 27 days | 0.0 | 42.6 |

The comparison between Caro's acid and the modified Caro's acid show that the modified Caro's acid has significantly more active $H_2O_2$ after the synthesis, and retains the activity for an extended period of time (at least 27 days); resulting in a product that has a significantly longer shelf life, increasing operational efficiency and minimizing the waste resulting from expired product.

7.5. Batch Process

Blend used: $H_2SO_4$:$H_2O_2$:sulfamic acid in a molar ratio of 10:10:1.

A batch process was carried out in order to scale up the use of a composition according to a preferred embodiment of the present invention in a process as discussed previously. For the preparation of a batch process, 3,301 g sulfuric acid (93%) was placed in a large glass reactor (10 L nominal volume) and 304 g sulfamic acid was added. The mixture was stirred at 100 RPM with an overhead Teflon paddle stirrer. Then 3,549 g of hydrogen peroxide solution (29%) was slowly added (1-1.5 h) to the modified acid. The reactor was chilled to dissipate the generated heat so that the temperature of the blend does not exceed 40° C. After the hydrogen peroxide addition 846 g of water was added to the mixture and the blend left to equilibrate to ambient temperature (about 30 minutes). The molar blend ratio (in order of addition) was 10:1:10. 400 g of unsized wood shavings (sawdust) was slowly added to the reactor (10 minutes). The temperature rise was monitored. When the reactor temperature reached 50° C., the reactor was chilled to a temperature of 26° C. After this, cooling was no longer necessary. The reaction was carried out for 20 h, then the reaction mixture was transferred to a filter system with a 20 µm Teflon filter sheet. The filtrate was discarded and the remaining filter cake washed with 12 liters of water until the runoff reached a pH value of about 6. The filter cake was the oven dried (45° C.) overnight. The cellulose yield compared to added biomass was 42.6%.

The hydrocarbon content of the resulting cellulose was determined to be 94.9% which is close to the Sigma-Aldrich cellulose lot #WXBC9745V—95.7% standard used as a comparison. The water content was determined to be 2.22% which is close to the Sigma-Aldrich cellulose lot #WXBC9745V—3% standard used as a comparison. The Kappa #=0, which means that there is no lignin left in the sample. X-ray diffraction was carried out on the sample and indicated that apparent crystallinity was of 58.2% which is in line with our previously tested numbers and the commercial cellulose from Aldrich was measured to be 62.9%. Scanning electron microscopy was carried out shows a material very high fiber content, higher than the Sigma-Aldrich product.

According to another preferred embodiment of the present invention, the composition can be used to decompose organic material by oxidation such as those used in water treatment, water purification and/or water desalination. An example of this is the removal (i.e. destruction) of algae on filtration membranes. As such membranes can be quite expensive, it is imperative that they be used for as long as possible. However, given the difficulty to remove organic matter which accumulates on it over time, new approaches are necessary to do so efficiently and with as little damage to the membrane as possible. Mineral acids are too strong and, while they will remove the organic matter, will damage the filtration membranes. A preferred composition of the present invention remedies this issue as it is less aggressive than the mineral acids and, as such, will remove the organic contaminants in a much milder approach, therefore sparing the membrane.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method of delignifying plant biomass or biomass material, said method comprising:
   providing said plant biomass or biomass material comprising cellulose fibers and lignin;
   exposing said plant biomass or biomass material to a composition comprising:
      sulfuric acid;
      a compound comprising an amine moiety and a sulfonic acid moiety; and
      a peroxide;
   wherein said sulfuric acid, said compound comprising an amine moiety and a sulfonic acid moiety, and said peroxide are present in the composition in a molar ratio of no less than 1:1:1;
   wherein said compound comprising an amine moiety and a sulfonic acid moiety is selected from taurine, taurolidine, taurocholic acid, tauroselcholic acid, tauromustine, 5-taurinomethyluridine, 5-taurinomethyl-2-thiouridine, homotaurine (tramiprosate), acamprosate, a taurate, and an aminoalkylsulfonic acid wherein the alkyl in said aminoalkylsulfonic acid is selected from C1-C5 linear alkyl and C1-C5 branched alkyl, and
   wherein said sulfuric acid and said compound comprising an amine moiety and a sulfonic acid moiety are present in a molar ratio of no less than 3:1,
   for a period of time sufficient to remove lignin present on said plant biomass or biomass material.

2. The method according to claim 1, wherein said compound comprising an amine moiety and a sulfonic acid moiety is selected from taurine, a taurate, and an aminoalkylsulfonic acid wherein the alkyl in said aminoalkylsulfonic acid is selected from C1-C5 linear alkyl and C1-C5 branched alkyl.

3. The method according to claim 1, wherein the peroxide is hydrogen peroxide.

4. The method according to claim 1, wherein said sulfuric acid, said compound comprising an amine moiety and a sulfonic acid moiety, and said peroxide are present in the composition in a molar ratio of no more than 15:1:1.

5. The method according to claim 1, wherein said compound comprising an amine moiety and a sulfonic acid moiety is a linear aminoalkylsulfonic acid selected from methyl, ethyl, n-propyl, and n-butyl.

6. The method according to claim 1, wherein said compound comprising an amine moiety and a sulfonic acid moiety is a C1-C5 branched aminoalkylsulfonic acid selected from isopropyl, isobutyl, and isopentyl.

7. The method according to claim 1, wherein said compound comprising an amine moiety and a sulfonic acid moiety is taurine.

8. The method according to claim 1, wherein said sulfuric acid is present in the composition in an amount ranging from 20-70 wt % of the total weight of the composition.

9. The composition according to claim 1, wherein said sulfuric acid is present in the composition in an amount ranging from 40-80 wt % of the total weight of the composition; and said sulfuric acid and said compound comprising an amine moiety and a sulfonic acid moiety are present in the composition in a molar ratio ranging from 3:1 to 15:1.

\* \* \* \* \*